3,012,462
VIEWING ASSEMBLY FOR OPTICAL INSTRUMENTS

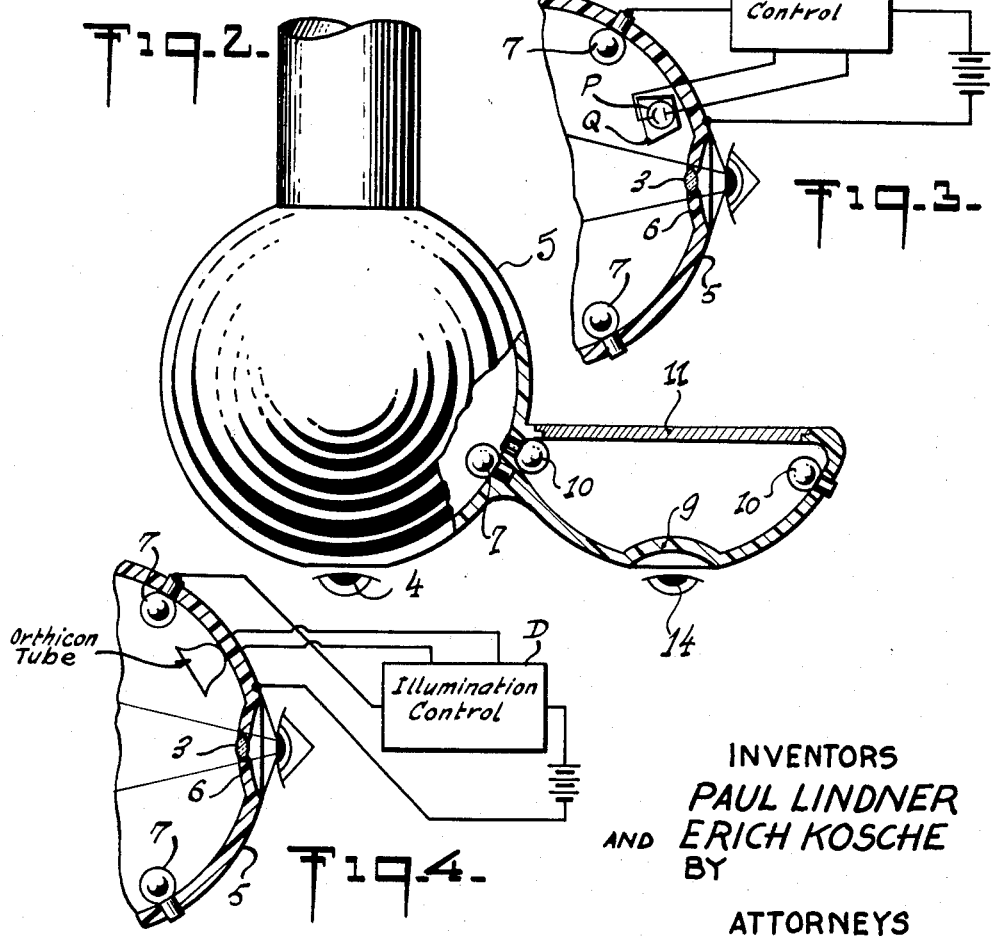

Erich Kosche, Horterweg 29, Berlin-Treptow, Germany, and Paul Lindner, Otzaler Strasse 15, Berlin-Pankow, Germany
Filed Dec. 12, 1956, Ser. No. 627,815
Claims priority, application Germany July 28, 1956
12 Claims. (Cl. 88—1)

This invention relates to a viewing assembly having an eye-piece, for use with optical instruments of all types, for example with microscopes, telescopes, viewers and the like, in which an optical image is viewed directly, as by a magnifying lens or ocular.

In direct-view optical apparatus of this type the light rays pass through an internally blackened tube from the plan of the optical image to the light outlet opening or eye-piece. In addition, the body of the eye-piece is usually opaque and colored black. The viewing field therefore appears to the eye as a relatively bright image area in a very dark surrounding field. Compared to the natural angle of vision which is approximately 140°, the viewing angle through an optical instrument is very small, generally about 10°. Certain devices are known, as for example camera view-finders, in which the actual image field appears inside a surrounding field from which it is separated by a frame or border. This surrounding field serves the photographer for purposes of orientation, particularly in following rapid motion. Even with such an arrangement, the total viewing field composed of both the image field and the surrounding field, remains small and appears light in a dark surrounding. Further, the viewing angle is very small compared to the natural viewing angle of the eye.

It is true that the small field of vision afforded by these devices takes into consideration the fact that the maximum sensitivity of the human eye is limited to a very small angle of vision or to a very small area of the retina. However, because of the strong contrast between the bright viewing field and the dark surrounding area, the ability of the eye to function under optimum conditions is impeded.

The best optical conditions exist when the light density of the inner and the surrounding fields are equal. This is because the sensitivity of the eye is greatest when such conditions are met, and under such conditions the relative strain on the eye is at a minimum. These facts lead to the conclusion that in instruments of the type here under consideration which are equipped with an opaque viewing tube, the eye is unable to operate in the region of its maximum efficiency, and it is well known that the eye tires easily in using such devices.

Proposals have been made for increasing the contrast sensitivity by illuminating the immediate vicinity of a particular image with the median intensity of the image. This surrounding illumination is accomplished by means of radiations from electric lights upon a phosphor-coated opaque diaphragm or iris or by use of a diffusion medium as a diaphragm such as opalescent glass. Even if this produces a distinct beneficial improvement the diaphragm can contribute only a comparatively small surrounding field because of its rather small surface so that only the difference in brightness between the diaphragm or the border and the picture is diminished and as a result of the reduced contrast between image and the border of the image, the image is somewhat more distinct. This knowledge has, for example, been used in television receivers whereby the mask surrounding the screen is illuminated or brightened by means of various light waves or by diffusion mirrors. However, the eye cannot operate in the region of its maximum efficiency with these devices and still tires easily because the illumination effect is controlled by the entire visual field for the optical perception. That is, the illumination must exist of the entire visual angle. The present arrangements do not consider the possibility of extending the iris to the borders of the visual angle and illumination of such would require extremely high technical and monetary expenditure.

In accordance with this invention the total range of the visual angle of the eye is illuminated at the median intensity of the image by an eye piece which surrounds the ocular lens or aperture and is made of translucent material and is presented as an illuminated surrounding field for the eye by means of incident light upon the eye piece over the range of the natural visual angle of the eye. The eye piece can be in the shape of a sphere or a section of a tube. The illumination can so operate that the eye piece walls are translucent and can be illuminated by surrounding light, that is, incident light. However, light can be produced on the inside of the eye piece or it may be arranged at the edge of the eye piece.

Additional objects and advantages of the invention will be apparent in the course of the following specification when taken in connection with accompanying drawings, in which:

FIG. 1 is a central vertical section through the viewing housing and a portion of an optical instrument, these parts being shown diagrammatically;

FIG. 2 is a plan view of a modified arrangement, with portions thereof broken away and shown in section to reveal inner construction;

FIG. 3 is a partial sectional view similar to FIG. 1, showing a photo-electric illumination control for the viewing assembly; and FIG. 4 is a partial sectional view similar to FIG. 3, showing the use of an orthicon tube for controlling the surround-field illumination of the device.

The viewing assembly shown in FIG. 1, includes a tube 12 in which is mounted an objective 1 which projects an image of the object being viewed through the tube and upon the planar surface of a field lens 2. The viewing assembly also includes lens 3 which may be a magnifying lens or the eye lens of an ocular. The viewer's eye, represented by numeral 4, views the image through lens 3 as it appears on the field lens 2.

The eye-piece housing 5 is shown diagrammatically in the form of a sphere, known in the trade as an "Ulbrecht's" sphere, the wall of which may be made of semi-transparent or translucent material such as glass or plastic. Alternately, the wall of the sphere can also be made of opaque material, the inner surface of which is white. In this instance, the only portion of the wall to be made translucent is the portion 6 which serves as the body of the eye-piece and borders the ocular 3.

One or more small light bulbs 7 may be mounted within the spherical housing 5 to illuminate the interior surface thereof, if the housing 5 is made of opaque material and is lined interiorly with a white reflective surface. The light bulbs 7 will then illuminate the white inner surface of the housing wall by incident light, and will also illuminate the translucent eye-piece body 6 by penetrating light.

In FIG. 1, the lines A, A indicate the natural angle of vision of the eye 4 which is approximately 140°. The viewing angle through the ocular 3 is indicated by the lines B, B, this angle being approximately 25° for the particular ocular shown. The field of view of the eye therefore will include the image contained on the field lens 2 with surround-field of the housing wall portion 8 which is circumscribed by the optical angle B, B of the ocular. The aforementioned surround-field is in turn bordered by an outer surround-field constituting the eye-piece body exterior 6 as circumscribed by the natural angle of vision A, A.

Since the interior wall surface of housing 5 is illuminated, as is the exterior of the eye-piece body 6, the eye will see the central image surrounded by the intermediate illuminated field reflected from wall portion 8, and by the outer illuminated field provided by light penetrating the translucent eye-piece body 6. If the illumination of the light bulbs 7 is matched to the median light density of the image, and the translucence of the eye-piece 6 is matched to the degree of reflection of the housing wall interior, an evenly illuminated field of view will be presented to the eye over its entire natural viewing angle.

In instruments designed for viewing with one eye, it is advantageous to present to the other eye also, an evenly illuminated field of the same or optimum light density as is presented to the viewing eye. The inactive eye may then be kept open and will not be distracted by images on its retina. FIG. 2 shows a modified embodiment of the viewing device incorporating such feature in which a second housing 11, containing an eye-piece 9, is connected to the spherical housing 5.

The eye-piece 9 is made of translucent material and is illuminated exteriorly by penetration of the light emitted from light bulbs 10. Only the eye-piece 9 need be translucent, the remainder of the housing 11 may be opaque and provided with a white interior reflecting surface. The rear wall opposite the eye-piece 9 may be a mirror.

While the viewing eye 4 is presented with an evenly-illuminated full field of view provided by the housing 5, as previously described, the inactive eye 14 is likewise presented with an evenly illuminated full field of view which constitutes the blank exterior surface of the illuminated translucent eye-piece 9. The intensity of bulbs 10 in this instance are regulated to provide the same brightness of viewing field for the inactive eye 14 as is provided for the viewing eye 4.

The invention disclosed herein is readily adaptable to a variety of applications. There are some applications, for example, where the special illumination provided by the light bulbs may be dispensed with, in which case the housing walls will be translucent and all illumination will be supplied by outside light.

In other applications, where the special interior illumination is used, this illumination may be adjustable, giving to the viewer the opportunity to control the light according to his preference at different times and conditions. This control of the surround-field illumination can be accomplished by inserting variable resistors in the energizing circuit for the light bulbs 7 and 10, in a manner which will be obvious to those skilled in the art. It will also be apparent that the control of illumination can be accomplished automatically by utilizing a photoelectric cell or other light-sensitive device in a location where it will be exposed to a portion of the image light rays, for instance in line with a split-beam mirror or the like. The photo-electric current is made proportional to the median light density and is used to increase or decrease the bulb current depending on the brilliance of the image. A manually operated control device is represented in FIG. 1 by the variable resistor R connected in series with the light bulbs 7 and the current source pertaining thereto.

FIG. 3 is a partial sectional view similar to FIG. 1, wherein a photo-electric cell P is mounted in a holder Q so that a portion of the image light rays emerging from the field lens impinge on the cell. The photo-electric cell P is connected to an illumination control circuit C which increases or decreases the current of the light bulbs 7 depending on the brilliance of the image to which the cell is exposed.

In view finders for television cameras, the camera orthicon tube may take the place of the photo-electric cell in the above example to perform the same function, namely to regulate the brightness of the surround-field illumination depending upon the brilliance of the image being viewed. FIG. 4 is a partial sectional view similar to FIG. 3, wherein an orthicon tube takes the place of the photo-electric cell and regulates the brightness of the surround-field illumination rendered by the bulbs 7 through the intermediary of an illumination control circuit D to which it is connected.

While preferred embodiments of the invention have been shown and described herein, it is obvious that numerous additions, changes and omissions may be made in the specific structure of such embodiments without departing from the spirit and scope of the invention.

What is claimed is:

1. A viewing assembly for optical instruments comprising a housing adapted to be secured to the ocular portion of an optical instrument, an ocular lens mounted in said housing for viewing the image formed by the ocular portion of said optical instrument, a translucent eye piece portion circumjacent said lens and arranged in direct view of a human eye disposed for vision through said ocular lens, means for illuminating said eye piece portion, said translucent eye piece portion being sufficient in size to intersect the entire range of the natural viewing angle of the human eye disposed for vision through said ocular lens.

2. A viewing assembly as set forth in claim 1 wherein said means for illuminating said translucent eye piece are mounted on said housing for illumination of the interior of said housing.

3. A viewing assembly for optical instruments comprising a housing having an eye-piece portion mounting an ocular, means to produce a projected image of the view field within the housing in a position to be viewed through the ocular, an artificial light source within the housing for illuminating the interior wall thereof, the body of the eye-piece portion surrounding the ocular being made of a material sufficiently translucent to be illuminated by penetration of light from within the housing, and to be viewed directly by an eye positioned for viewing through said ocular and adjustable means for varying the intensity of the artificial light source, whereby the intensity of illumination of the interior housing wall portion bordering the image and the exterior of the eye-piece may be matched to the light intensity of the image.

4. A viewing assembly according to claim 3 in which the adjustable light-varying means is automatically controlled by a photo-sensitive element.

5. A viewing assembly according to claim 3 in which the image is produced by the view finder of a television camera, the adjustable light varying means being controlled automatically by the orthicon tube of the television camera.

6. A viewing assembly for optical instruments comprising a housing secured to the optical instrument, a translucent eye piece portion in said housing, an ocular lens mounted in said portion for viewing an image from said optical instrument, means for illuminating said eye piece portion, said translucent eye piece portion being sufficient in size to intersect the entire range of the natural viewing angle of the human eye disposed for vision through said ocular lens, said means for illuminating said translucent eye piece including means for selectively varying said illumination to correspond to the median illumination of said image.

7. A viewing assembly for optical instruments comprising a housing secured to an optical instrument, a translucent eye piece portion in said housing, an ocular lens mounted in said portion for viewing an image from said optical instrument, means for illuminating said eye piece portion, said translucent eye piece portion being sufficient in size to intersect the entire range of the natural viewing angle of the human eye disposed for vision through said ocular lens, said housing including a light-colored opaque wall.

8. A viewing assembly for an optical instrument comprising a spherical housing adapted for securing to the optical instrument, a translucent eye piece in said housing opposite the optical instrument, an ocular lens mounted in said eye piece adapted to produce an image for an observing eye, said eye piece being of sufficient size to intersect the extreme ends of the natural viewing angle of the eye, an electric light mounted in said housing for illumination of the inside of said housing, an electric current source for said electric light connected to said electric light, a variable impedance for selectively regulating the illumination of said eye piece whereby the illumination of said eye piece corresponds to the median illumination of the image.

9. An assembly as in claim 1, wherein said eye piece portion is annularly shaped.

10. In an optical instrument having an ocular lens, annular translucent light diffusion means surrounding and supporting said ocular lens in direct view of a human eye disposed for viewing through said lens, said light diffusion means being of sufficient size to intersect the natural viewing angle of the human eye disposed for viewing through said ocular lens, and means in said instrument for illuminating said light diffusion means.

11. A viewing assembly for an optical instrument comprising a spherical housing adapted for securing to the optical instrument, a translucent eye piece in said housing forming a depression in said housing opposite the optical instrument, an ocular lens mounted in said eye piece adapted to produce an image for an observing eye, said eye piece being of sufficient size to intersect the extreme ends of the natural viewing angle of the eye, an electric light mounted in said housing for illumination of the inside of said housing, an electric current source for said electric light connected to said electric light, a variable impedance for selectively regulating the illumination of said eye piece whereby the illumination of said eye piece corresponds to the median illumination of the image.

12. An assembly as set forth in claim 11 further comprising an additional eye piece member for an inactive eye of an observer, said member including a translucent eye piece and means for illuminating said eye piece to substantially the same light intensity as provided to the surrounding field of the image, said eye piece being sufficient in size to intersect the total range of natural viewing angle of the inactive eye.

References Cited in the file of this patent

UNITED STATES PATENTS

| | | |
|---|---|---|
| 1,498,214 | Tuck | June 17, 1924 |
| 1,795,752 | Bauersfeld et al. | Mar. 10, 1931 |
| 2,043,840 | Singer | June 9, 1936 |
| 2,288,143 | Sheppard | June 30, 1942 |
| 2,298,870 | Cooper | Oct. 13, 1942 |
| 2,327,612 | Stone et al. | Aug. 24, 1943 |
| 2,374,991 | Gordon | May 1, 1945 |

FOREIGN PATENTS

| | | |
|---|---|---|
| 168,235 | Austria | May 10, 1951 |
| 173,567 | Austria | June 15, 1952 |

OTHER REFERENCES

Fundamentals of Optical Engineering, McGraw-Hill Book Co., Jacobs, 1943, pages 186 and 187.